United States Patent
Stenson

(10) Patent No.: US 12,392,876 B2
(45) Date of Patent: Aug. 19, 2025

(54) METHOD FOR DERIVING SURFACE MATERIAL PROPERTIES OF SURFACE MATERIALS BASED UPON LIDAR DATA, COMPUTING SYSTEM AND NON-TRANSITORY COMPUTER-READABLE STORAGE MEDIUM

(71) Applicant: GM CRUISE HOLDINGS LLC, San Francisco, CA (US)

(72) Inventor: Richard Stenson, Miami, FL (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 920 days.

(21) Appl. No.: 17/545,601

(22) Filed: Dec. 8, 2021

(65) Prior Publication Data

US 2023/0176200 A1 Jun. 8, 2023

(51) Int. Cl.
| | |
|---|---|
| *G01S 7/497* | (2006.01) |
| *G01S 7/48* | (2006.01) |
| *G01S 7/481* | (2006.01) |
| *G01S 7/487* | (2006.01) |
| *G01S 17/89* | (2020.01) |

(52) U.S. Cl.
CPC ............ *G01S 7/497* (2013.01); *G01S 7/4802* (2013.01); *G01S 7/4817* (2013.01); *G01S 7/487* (2013.01); *G01S 17/89* (2013.01)

(58) Field of Classification Search
None
See application file for complete search history.

(56) References Cited

U.S. PATENT DOCUMENTS

| | | | |
|---|---|---|---|
| 10,338,223 B1* | 7/2019 | England | G06F 18/217 |
| 2019/0179015 A1* | 6/2019 | Raring | F21K 9/64 |
| 2020/0249353 A1* | 8/2020 | Di Cicco | G01S 7/4808 |
| 2021/0033706 A1* | 2/2021 | Funaya | G06V 20/64 |
| 2021/0405200 A1* | 12/2021 | Ding | G06T 17/05 |

* cited by examiner

*Primary Examiner* — Haris Sabah
(74) *Attorney, Agent, or Firm* — CANTOR COLBURN LLP

(57) ABSTRACT

The disclosure provides a method for deriving a surface absorption property of a surface material from LIDAR data. The method may include receiving cloud points from a LIDAR sensor. The cloud points are characterized by intensity values corresponding to reflections off the surface material of a real-world object and respective 3D coordinates. The method may also include constructing surface segments of the surface material by building triangles from three neighboring cloud points, determining the normal direction for each triangle from each cloud point, and deriving the surface absorption property for the segment of the surface material based upon the average intensity values for the three neighboring cloud points, a known angle of incidence, and the determined normal direction for each of the respective triangle. The method may further include aggregating the derived surface absorption property across a collection of respective triangles to result in the surface absorption property for a type of surface.

20 Claims, 5 Drawing Sheets

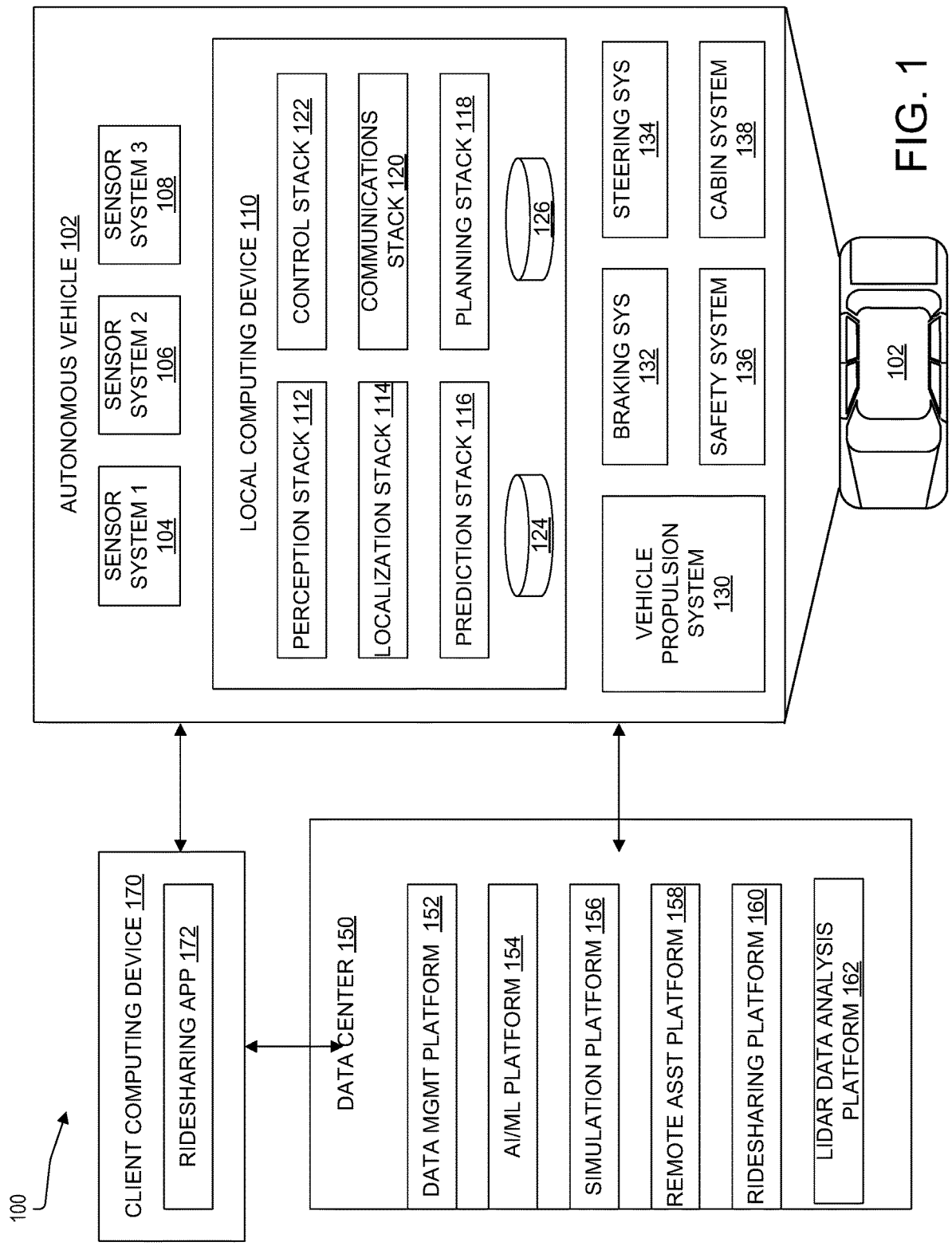

METHOD FOR DERIVING SURFACE MATERIAL PROPERTIES OF SURFACE MATERIALS BASED UPON LIDAR DATA, COMPUTING SYSTEM AND NON-TRANSITORY COMPUTER-READABLE STORAGE MEDIUM

TECHNICAL FIELD

The subject technology pertains to using data or cloud points received from Light Detection and Ranging (LiDAR) sensors to do surface constructions and to derive surface material properties of surface materials.

BACKGROUND

An autonomous vehicle is a motorized vehicle that can navigate without a human driver. An exemplary autonomous vehicle includes a plurality of sensor systems, such as, but not limited to, a camera sensor system, a LIDAR sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system. In some applications, these systems utilize a perception system (or perception stack) that implements various computing vision techniques to reason about the surrounding environment.

SUMMARY

The present technology pertains to deriving a surface absorption property of surface material from LIDAR data. In one aspect, the technology may include receiving a plurality of cloud points from a LIDAR sensor. The cloud points characterized by respective intensity values corresponding to reflections off the surface material of a real-world object and respective 3D coordinates. The technology may also include constructing a plurality of surface segments of the surface material by building a plurality of triangles from combinations of three neighboring cloud points from among the received plurality of cloud points. Each of the plurality of triangles is a surface segment. The technology may also include determining the normal direction for each of the plurality of triangles from the 3D coordinates of each of the cloud points in the combination of three neighboring cloud points making up a respective triangle. The technology may also include deriving the surface absorption property for a respective segment of the surface material based upon the average intensity values for the three neighboring cloud points making up a respective triangle, a known angle of incidence received from the LIDAR sensor, and the determined normal direction for each of the respective triangle. The technology may further include aggregating the derived surface absorption property across a collection of respective triangles making up the surface segments to result in the surface absorption property for a type of surface.

Additional aspects, embodiments, and features are set forth in part in the description that follows and will become apparent to those skilled in the art upon examination of the specification or may be learned by the practice of the disclosed subject matter. A further understanding of the nature and advantages of the disclosure may be realized by reference to the remaining portions of the specification and the drawings, which form a part of this disclosure.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 1 illustrates an example of a system for managing one or more Autonomous Vehicles (AVs) according to some aspects of the present technology;

DETAILED DESCRIPTION

Figure 2A:
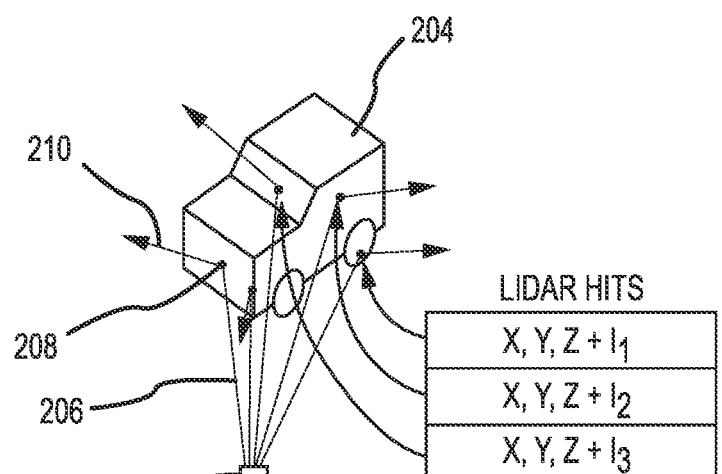
FIG. 2A illustrates a LIDAR sensor scanning a real-world object according to some examples of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form to facilitate describing one or more aspects. Further, it is to be understood that functionality that is described as being carried out by certain system components may be performed by more or fewer components than shown.

When an autonomous vehicle (AV) drives on the road, data is captured by LIDAR sensors on the AV. The LIDAR sensors can detect the distances of real-world objects in a scene. The LIDAR sensors output LIDAR data, including intensities of reflected light and angles of incidence from real-world objects. The LIDAR data can be converted to a simulated scene. However, simulated objects or synthetic objects in the simulated scene may not be the same as the real-world objects in the scene on the road. The surface absorption properties of real-world objects may affect the reflections from the objects. The surface absorption property affects surface reflectance, which varies with the type of material of the real-world objects. Therefore, it is important to derive the surface absorption property of the surface material.

The disclosure provides methods that use cloud points received from a LIDAR sensor to do surface constructions and determine surface absorption properties of the surface material.

The disclosed method uses the data captured by the LIDAR sensor when an AV drives on the road to determine actual LIDAR beam intensities and to identify surface materials for use in simulations. The beam intensities captured are used to determine the surface material based on the derived normal vectors at surfaces constructed from cloud points.

FIG. 1 illustrates an example of an AV management system 100. One of the ordinary skills in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of the ordinary skills in the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along with the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., the direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left-turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine-learning algorithms that are incorporated in the local computing device 110.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine-learning (AI/ML) platform 154, a simulation platform 156, a remote assistance platform 158, a ridesharing platform 160, and a LIDAR data analysis platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having differently structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time-series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine-learning algorithms for operating the AV 102, the simulation platform 156, the remote assistance platform 158, the ridesharing platform 160, and other platforms and systems. Using the AI/ML platform 154, data scientists can prepare data sets from the data management platform 152; select, design, and train machine-learning models; evaluate, refine, and deploy the models; maintain, monitor, and retrain the models; and so on.

The simulation platform 156 can enable testing and validation of the algorithms, machine-learning models, neural networks, and other development efforts for the AV 102, the remote assistance platform 158, the ridesharing platform 160, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

The LIDAR data analysis platform 162 may derive a surface absorption property of surface material from LIDAR data. The LIDAR data analysis platform 162 may construct a surface structure by building a plurality of triangles from the cloud points from a LIDAR sensor. The cloud points are characterized by respective intensity values corresponding to reflections off the surface material of a real-world object and respective 3D coordinates. The LIDAR data analysis platform 162 may also determine the normal direction for each of the plurality of triangles. The LIDAR data analysis platform 162 may also derive the surface absorption property of the surface material based upon the intensities, incidence angles, and the normal direction for each of the plurality of triangles.

FIG. 2A illustrates a LIDAR sensor scanning a real-world object according to some examples of the present technology. As illustrated in FIG. 2A, incoming light rays 206 from a LIDAR sensor 202 are reflected off a real-world object (e.g., vehicle) 204 at light hitting locations 208 represented by 3D coordinates X, Y, and Z. Outgoing light rays 210 bounced from the vehicle 204 are directed in various directions.

Figure 2B:
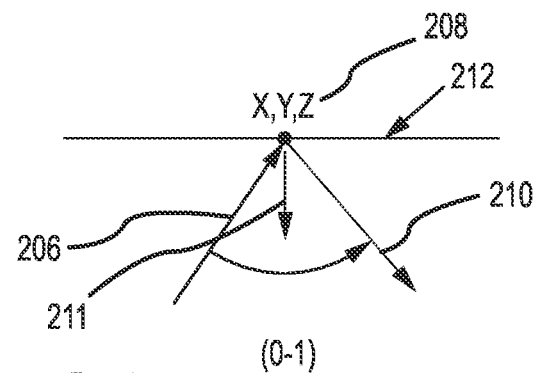
FIG. 2B illustrates the reflection from the real-world object of FIG. 2A detected by a LIDAR sensor according to some examples of the present technology.

FIG. 2B illustrates the reflection from the real-world object of FIG. 2A detected by a LIDAR sensor according to some examples of the present technology. As illustrated, an angle of incidence $\Phi$ is the angle between the incoming light ray 206 from the LIDAR sensor 202 and the outgoing light ray 210 reflected off a surface 212 associated with a type of material, e.g., car paint, glass. The intensities reflected off the real-world object received by the LIDAR sensor 202 may vary with the angle of incidence and the surface material of the real-world object. A normal direction 211 is perpendicular to the surface 212 and splits the angle of incidence $\Phi$ into half to have an angle $\theta$.

In some variations, Cos $\theta$ may vary from 0 to 1 when $\theta$ varies from 90° to 0°.

Figure 2C:
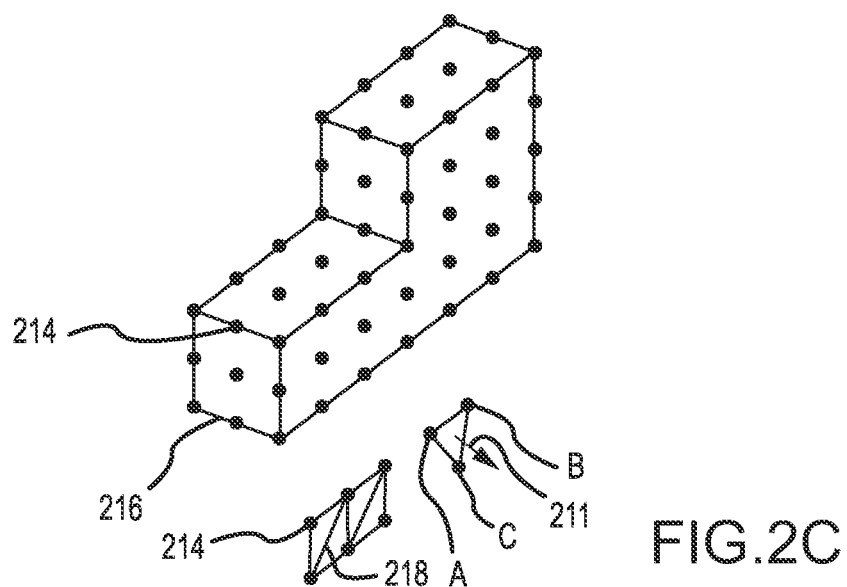
FIG. 2C illustrates cloud points that are collected from the real-world object of FIG. 2A according to some examples of the present technology.

FIG. 2C illustrates cloud points that are collected from the real-world object of FIG. 2A according to some examples of the present technology. As an example, the real-world object is selected as a vehicle. Cloud points 214 are the data collected from the LIDAR sensor 202 and can collectively form a point cloud. The point cloud may be reviewed and a human or an algorithm may label a vehicle as being represented in the point cloud. It can be hard to see that the point cloud includes a vehicle, but a vehicle can be perceived and is illustrated by solid lines 216.

In some embodiments, a surface of a portion of the vehicle can be reconstructed. The reconstruction may be done by building triangles 218 from three closest cloud points 214. For example, the cloud points A, B, and C are connected to form triangle 218. Each triangle 218 has the normal direction 211, which is perpendicular to triangle 218. The normal direction 211 is derived from the vectors AB and AC and is a cross-product of vectors AB and AC.

While it can be difficult to visually perceive a vehicle included in a point cloud, the identification of a vehicle within the point cloud can be improved using an understanding of the reflectance properties of the vehicle and more helpfully an understanding of reflection properties of different surfaces of the vehicle. The derived reflectance or surface absorption property from various materials helps reconstruct the vehicle because it may facilitate additional identification of headlights or taillights of vehicle, windows of the vehicle, or vehicle tires or wheels.

It should be noted that while the present technology is described with respect to identifying surface properties of vehicles, that the present technology applies equally to identifying surface properties of any surface in a point cloud.

Figure 3:
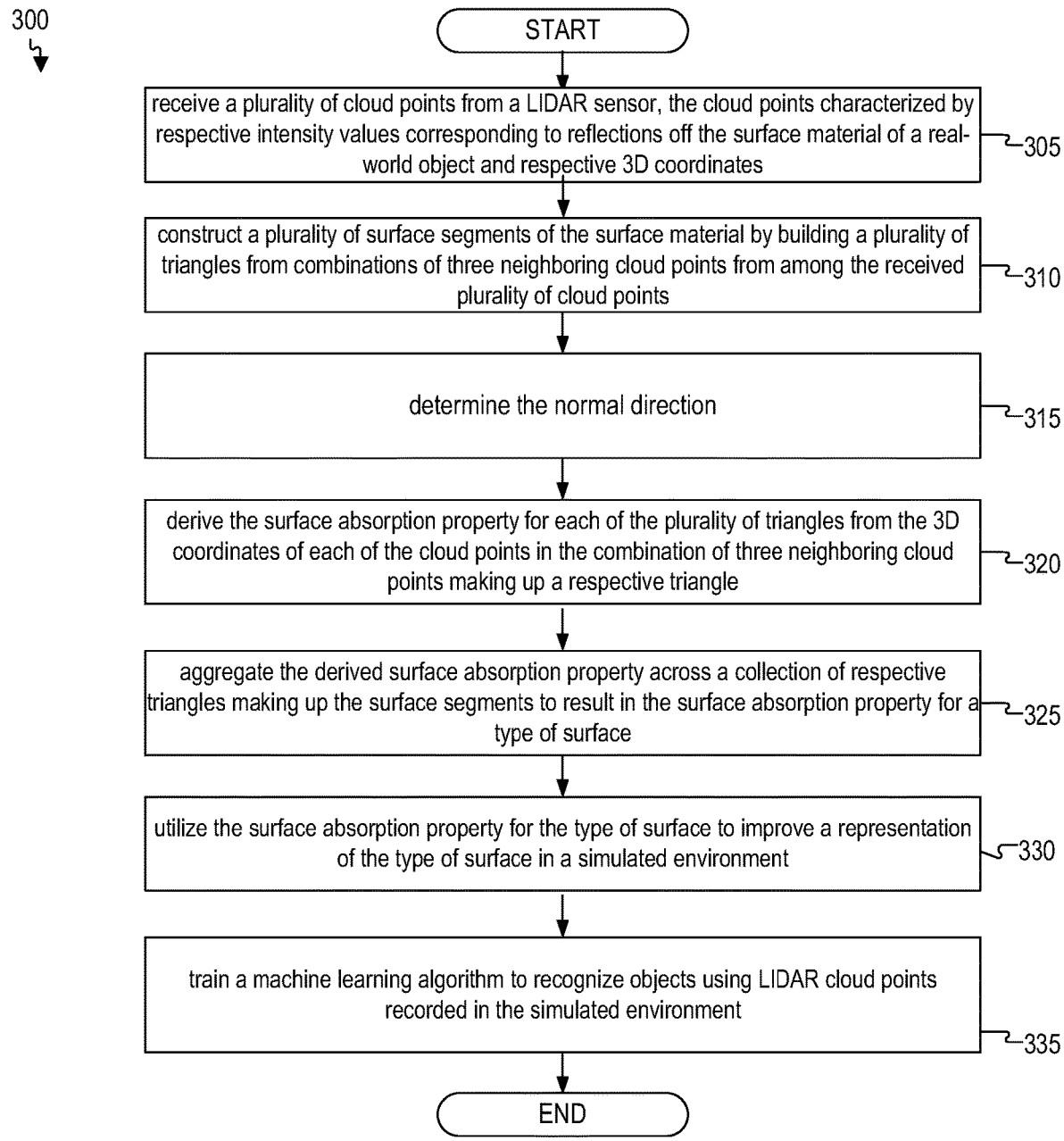
FIG. 3 is a flowchart of a method for deriving a surface absorption property of surface material from LIDAR data according to some examples of the present technology.

FIG. 3 illustrates an example method 300 for deriving a surface absorption property of surface material from LIDAR data. Although example method 300 depicts a particular sequence of operations, the sequence may be altered without departing from the scope of the present disclosure. For example, some of the operations depicted may be performed in parallel or in a different sequence that does not materially affect the function of method 300. In other examples, different components of an example device or system that implements the method 300 may perform functions at substantially the same time or in a specific sequence.

According to some examples, method 300 may include receiving a plurality of cloud points from a LIDAR sensor at block 305. For example, the data management platform 152 illustrated in FIG. 1 may receive a plurality of cloud points from a LIDAR sensor. The cloud points are characterized by respective intensity values corresponding to reflections off the surface material of a real-world object and respective 3D coordinates. The LIDAR data can originate for data collected by LIDAR sensors on AV 102.

In some variations, the LIDAR sensor uses infrared light for sensing a scene. The advantage of using infrared light is that the reflection does not change with the color of the objects, regardless of black, white, red, or blue body.

According to some examples, method 300 may include constructing a plurality of surface segments of the surface material by building a plurality of triangles from combinations of three neighboring cloud points from among the received plurality of cloud points at block 310. For example, the LIDAR data analysis platform 162 of the data center 150 illustrated in FIG. 1 may construct a plurality of surface segments of the surface material by building a plurality of triangles from combinations of three neighboring cloud points from among the received plurality of cloud points. Each of the plurality of triangles is a surface segment.

To construct surface segments or triangles, one of the plurality of cloud points may be selected as a starting point cloud. For example, a center coordinate in the point cloud may be considered a starting point, based upon x, y, z coordinates. A triangle can be built by connecting these cloud points based upon the starting cloud point and two nearest neighboring cloud points to the starting cloud point. A normal vector can then be identified from the triangle formed from the cloud points and used to determine the surface absorption property.

In some variations, method 300 may include selecting one of the three neighboring cloud points as a starting point cloud. For example, the LIDAR data analysis platform 162 illustrated in FIG. 1 may select one of the three neighboring cloud points as a starting point cloud.

In some variations, method 300 may include searching for the closest first and second cloud points from the starting point cloud within a threshold distance. For example, the LIDAR data analysis platform 162 illustrated in FIG. 1 may search for the closest first and second cloud points within a threshold distance from the starting cloud point. The threshold distance limits the search of the closest point within a range. If the search fails within the threshold distance, the search may start with a different cloud point.

In some variations, method 300 may include forming the first triangle from the closest first and second cloud points and the starting point. For example, the LIDAR data analysis platform 162 illustrated in FIG. 1 may form a first triangle from the closest first and second cloud points and the starting point. More triangles can be formed or created this way by connecting the closest cloud points.

According to some examples, method 300 may include determining the normal direction for each of the plurality of triangles from the 3D coordinates of each of the cloud points in the combination of three neighboring cloud points making up a respective triangle at block 315. For example, the LIDAR data analysis platform 162 illustrated in FIG. 1 may determine the normal direction for each of the plurality of triangles from the 3D coordinates of each of the cloud points in the combination of three neighboring cloud points making up a respective triangle. The normal direction affects the intensity reflected from the real-world object back to the LIDAR sensor. For example, if the normal direction is aligned with the incident light signals from the LIDAR sensor, the reflection is higher than any other angle. If the normal direction is close to the surface, the reflection is nearly zero.

In some variation, method 300 may include determining a difference between the normal directions of neighboring triangles. For example, the LIDAR data analysis platform 162 illustrated in FIG. 1 may determine a difference between the normal directions of neighboring triangles. The difference between the normal directions of neighboring triangles may suggest a curved surface or a flat surface depending upon a large difference or a small difference.

According to some examples, method 300 may include deriving the surface absorption property for a respective segment of the surface material based upon the average intensity values for the three neighboring cloud points making up a respective triangle, a known angle of incidence received from the LIDAR sensor, and the determined normal direction for each of the respective triangles at block 320. For example, the LIDAR data analysis platform 162 illustrated in FIG. 1 may derive the surface absorption property for a respective segment of the surface material based upon the average intensity values for the three neighboring cloud points making up a respective triangle, a known angle of incidence received from the LIDAR sensor, and the determined normal direction for each of the respective triangle.

In some variations, the deriving the surface absorption property for the respective segment is a product of the average intensity values for the three neighboring cloud points making up the respective triangle and cosine of the angle of incidence to the normal direction for the respective triangle.

If the reflection is a direct reflection from the real-world object, while the intensity is low. This may suggest that the surface material has low reflectance, such as a tire of a vehicle. If the reflection is a direct reflection from the real-world object, while the intensity is high, this may suggest that the surface material has high reflectance, such as a taillight or a headlight.

According to some examples, method 300 may include aggregating the derived surface absorption property across a collection of respective triangles making up the surface segments to result in the surface absorption property for a type of surface at block 325. For example, the LIDAR data analysis platform 162 illustrated in FIG. 1 may aggregate the derived surface absorption property across a collection of respective triangles making up the surface segments to result in the surface absorption property for a type of surface.

The surface absorption property may be surface reflectance. Some materials may have high reflectance for light signals, while other materials may have low reflectance for the light signals. For example, the surface reflectance from different portions of the AV may vary, such as vehicle body, taillights or headlights, windows, or tires, among others.

According to some examples, method 300 may include utilizing the surface absorption property for the type of surface to improve a representation of the type of surface in a simulated environment, whereby intensity values recorded by a simulated LIDAR in the simulated environment are more accurate at block 330. For example, the simulation platform 156 illustrated in FIG. 1 may utilize the surface absorption property for the type of surface to improve a representation of the type of surface in a simulated environment. The intensity values recorded by a simulated LIDAR in the simulated environment are more accurate due to the consideration of the surface absorption properties or surface reflectance of the surface material.

A human may label the cloud points initially as a vehicle, a pedestrian, or a light pole by a human. The simulation platform further analyzes these cloud points to produce a more realistic representation of the type of surface by adding a surface reflectance modifier.

The surface reflectance modifier may be introduced in simulations. The surface reflectance modifier may vary from 0 to 255. For example, light signals may have very low reflections from tires. The surface reflectance modifier may be assumed as 5 on a scale from 0 to 255. Light signals may have low reflections from car paint and vehicle window and rims. The surface reflectance modifier may be assumed as 50, 80, and 100 for the car paint, window or glass, and rims, respectively, on a scale from 0 to 255. Light signals may have high reflections from headlights or taillights that are retro-reflectors. The surface reflectance modifier may be assumed as 150-200 for the headlights and taillights, on a scale from 0 to 255.

According to some examples, method 300 may include training a machine-learning algorithm to recognize objects using LIDAR cloud points recorded in the simulated environment, whereby the machine-learning algorithm learns to recognize objects in part based on intensity values associated with surface materials making up the objects at block 335. For example, the AI/ML platform 154 illustrated in FIG. 1 may train a machine-learning algorithm to recognize objects using LIDAR cloud points recorded in the simulated environment. The machine-learning algorithm learns to recognize objects in part based on intensity values associated with surface materials making up the objects.

In some variations, the machine-learning algorithm is trained using a labeled dataset. The labeled dataset includes cloud points with intensity values that are within a labeled bounding box that provides a semantic label identifying the type of object.

For example, the machine-learning algorithm may look at the intensity of the cloud points and determine that the point cloud looks like a bush without the derived material type. However, the machine-learning algorithm may look at both the intensity of the cloud points and the derived material type to determine that the cloud points may be a windshield or a wheel for a vehicle. The derived material type helps identify the object along with the light intensity using the machine-learning algorithm.

Method 300 may also include determining surface curvature based upon the pattern of the normal directions. For example, when a plurality of closest cloud points to a small angle range (e.g., less than 20 degrees angle), the surface is likely flat. When a plurality of closest cloud points to a large angle range (e.g., greater than 20 degrees angle), the surface is likely curved.

In some variations, method 300 may include deriving the surface material based upon the intensity variations with incident angles and the derived attenuation. For example, if the intensity pattern changes steeply with angles, and the derived attenuation is low, it may suggest that the surface material has high reflectance, such as taillight or headlight. If the intensity pattern does not change much with angles, and the derived attenuation is high, it may suggest that the surface material has low reflectance, such as the vehicle body.

Figure 4A:
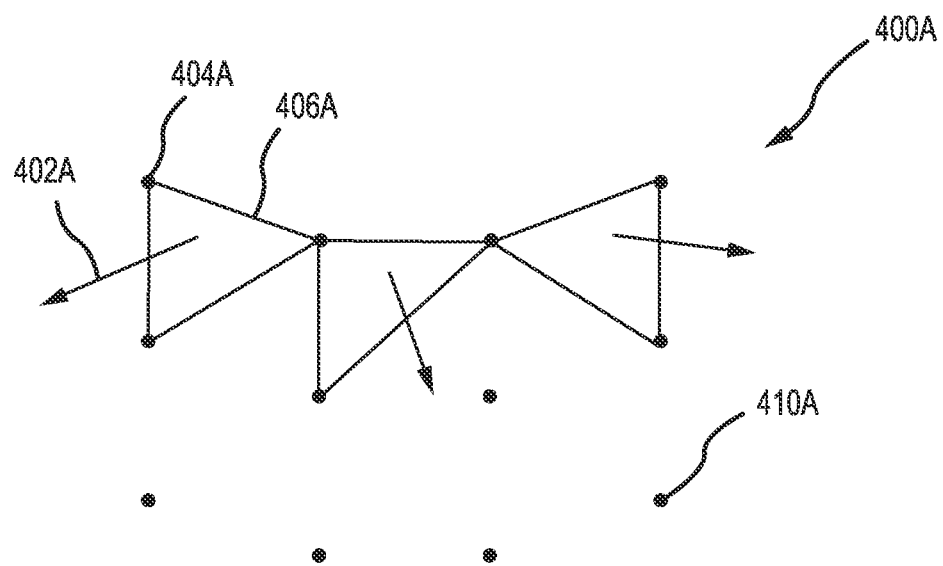
FIG. 4A is a sketch illustrating a curved surface with triangles having large variations in normal directions according to some examples of the present technology.

FIG. 4A is a sketch illustrating a curved surface with triangles having large variations in normal directions according to some examples of the present technology. As illustrated in FIG. 4A, surface pattern 400A is constructed from triangles 406A, which are built from cloud points 404A. Each triangle 406A has a normal direction 402A perpendicular to the triangle. The normal directions 402A are pointed in various directions, suggesting that surface 400A is a curved surface.

Figure 4B:
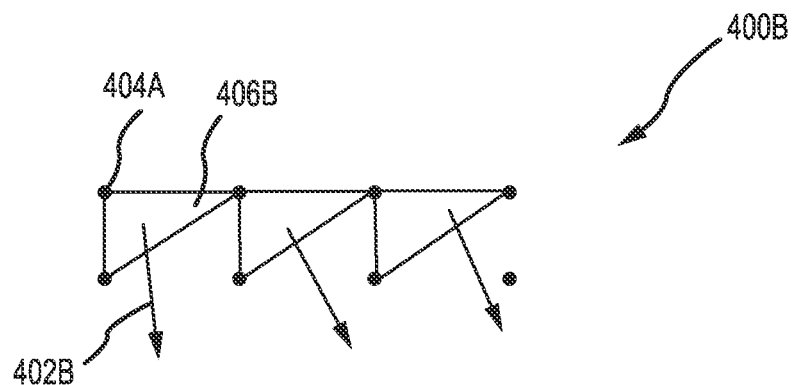
FIG. 4B is a sketch illustrating a relatively flat surface with triangles having small variations in normal directions according to some examples of the present technology.

FIG. 4B is a sketch illustrating a relatively flat surface with triangles having small variations in normal directions according to some examples of the present technology. As illustrated in FIG. 4B, surface pattern 400B is constructed from triangles 406B, which are built from cloud points 404B. Each triangle 406B has a normal direction 402B perpendicular to the triangle. The normal directions 402B are pointed down within a narrow range of angles, suggesting that the surface 400A is relatively flat.

In some variations, method 300 may include concluding that the surface material represented by the neighboring triangles is curved when the difference between the normal directions of the neighboring triangles is greater than 20-degrees. For example, the LIDAR data analysis platform 162 illustrated in FIG. 1 may conclude that the surface material represented by the neighboring triangles is curved when the difference between the normal directions of the neighboring triangles is greater than 20-degrees.

Figure 5:
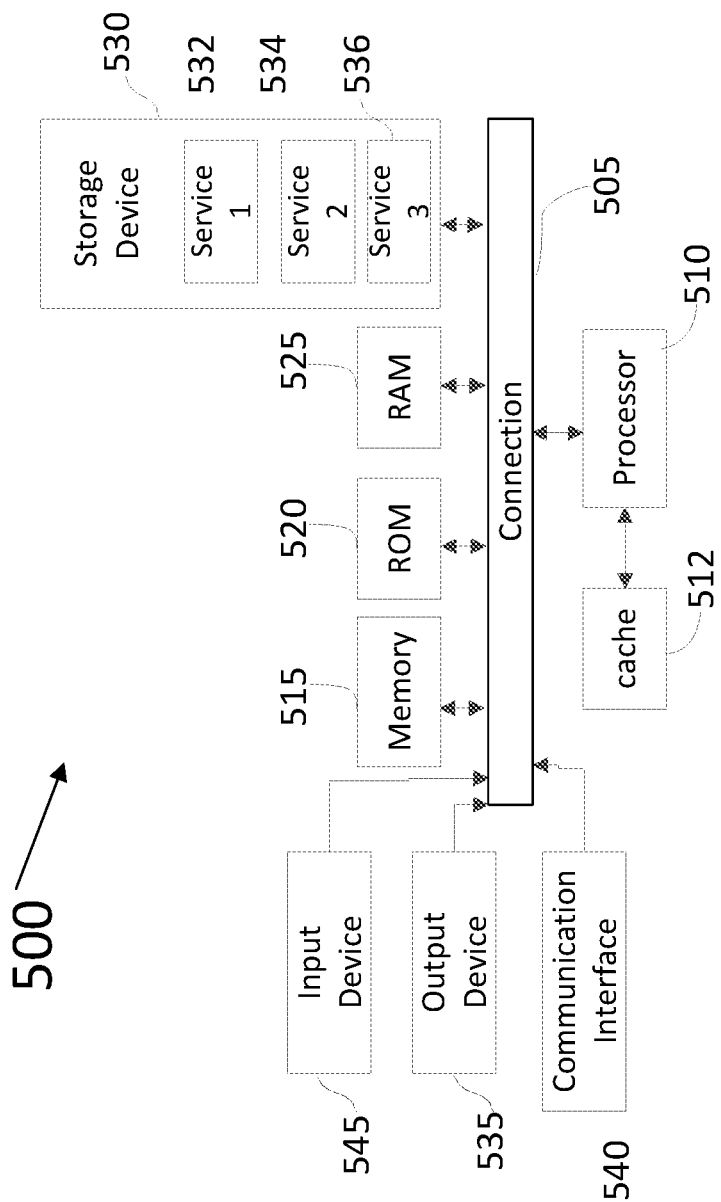
FIG. 5 shows an example of a system for implementing certain aspects of the present technology.

FIG. 5 shows an example of computing system 500, which can be, for example any computing device making up the local computing system 110, the client computing device 170, the computing component in data center 150, or the components thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a data center, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer-readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for deriving a surface absorption property of surface material from LIDAR data, the method comprising:
   receiving a plurality of cloud points from a LIDAR sensor, the cloud points characterized by respective intensity values corresponding to reflections off the surface material of a real-world object and respective 3D coordinates,
   constructing a plurality of surface segments of the surface material by building a plurality of triangles from combinations of three neighboring cloud points from among the received plurality of cloud points, wherein each of the plurality of triangles is a surface segment;
   determining the normal direction for each of the plurality of triangles from the 3D coordinates of each of the cloud points in the combination of three neighboring cloud points making up a respective triangle;

deriving the surface absorption property for a respective segment of the surface material based upon the average intensity values for the three neighboring cloud points making up a respective triangle, a known angle of incidence received from the LIDAR sensor, and the determined normal direction for each of the respective triangle; and aggregating the derived surface absorption property across a collection of respective triangles making up the surface segments to result in the surface absorption property for a type of surface.

2. The method of claim 1, wherein the constructing the plurality of surface segments of the surface material by building the plurality of triangles comprises:

selecting one of the three neighboring cloud points as a starting point cloud;

searching for the closest first and second cloud points from the starting point cloud within a threshold distance; and forming a first triangle from the closest first and second cloud points and the starting point.

3. The method of claim 1, further comprising:

determining a difference between the normal directions of neighboring triangles; and concluding that the surface material represented by the neighboring triangles is curved when the difference between the normal directions of the neighboring triangles is greater than 20-degrees.

4. The method of claim 1, wherein the LIDAR sensor uses infrared light for sensing a scene.

5. The method of claim 1, wherein the deriving the surface absorption property for the respective segment is a product of the average intensity values for the three neighboring cloud points making up the respective triangle and cosine of the angle of incidence to the normal direction for the respective triangle.

6. The method of claim 1, further comprising utilizing the surface absorption property for the type of surface to improve a representation of the type of surface in a simulated environment, whereby intensity values recorded by a simulated LIDAR in the simulated environment are more accurate.

7. The method of claim 1, further comprising training a machine-learning algorithm to recognize objects using LIDAR cloud points recorded in the simulated environment, whereby the machine-learning algorithm learns to recognize objects in part based on intensity values associated with surface materials making up the objects.

8. The method of claim 7, wherein the machine-learning algorithm is trained using a labeled dataset, wherein the labeled dataset comprises cloud points with intensity values that are within a labeled bounding box that provides a semantic label identifying the type of object.

9. A computing system comprising:

a storage device configured to store instructions;

a processor configured to execute the instructions and cause the processor to:

receive a plurality of cloud points from a LIDAR sensor, the cloud points characterized by respective intensity values corresponding to reflections off the surface material of a real-world object and respective 3D coordinates, construct a plurality of surface segments of the surface material by building a plurality of triangles from combinations of three neighboring cloud points from among the received plurality of cloud points, wherein each of the plurality of triangles is a surface segment, determine the normal direction for each of the plurality of triangles from the 3D coordinates of each of the cloud points in the combination of three neighboring cloud points making up a respective triangle, derive the surface absorption property for a respective segment of the surface material based upon the average intensity values for the three neighboring cloud points making up a respective triangle, a known angle of incidence received from the LIDAR sensor, and the determined normal direction for each of the respective triangle, and aggregate the derived surface absorption property across a collection of respective triangles making up the surface segments to result in the surface absorption property for a type of surface.

10. The computing system of claim 9, wherein the processor is configured to execute the instructions and cause the processor to:

select one of the three neighboring cloud points as a starting point cloud;

search for the closest first and second cloud points from the starting point cloud within a threshold distance; and form a first triangle from the closest first and second cloud points and the starting point.

11. The computing system of claim 9, wherein the processor is configured to execute the instructions and cause the processor to:

determine a difference between the normal directions of neighboring triangles; and conclude that the surface material represented by the neighboring triangles is curved when the difference between the normal directions of the neighboring triangles is greater than 20-degrees.

12. The computing system of claim 9, wherein the deriving the surface absorption property for the respective segment is a product of the average intensity values for the three neighboring cloud points making up the respective triangle and cosine of the angle of incidence to the normal direction for the respective triangle.

13. The computing system of claim 9, wherein the processor is configured to execute the instructions and cause the processor to utilize the surface absorption property for the type of surface to improve a representation of the type of surface in a simulated environment, whereby intensity values recorded by a simulated LIDAR in the simulated environment are more accurate.

14. The computing system of claim 9, wherein the processor is configured to execute the instructions and cause the processor to train a machine-learning algorithm to recognize objects using LIDAR cloud points recorded in the simulated environment, whereby the machine-learning algorithm learns to recognize objects in part based on intensity values associated with surface materials making up the objects.

15. A non-transitory computer-readable storage medium comprising instructions, the instructions, when executed by a computing system, cause the computing system to:

receive a plurality of cloud points from a LIDAR sensor, the cloud points characterized by respective intensity values corresponding to reflections off the surface material of a real-world object and respective 3D coordinates;

construct a plurality of surface segments of the surface material by building a plurality of triangles from combinations of three neighboring cloud points from among the received plurality of cloud points, wherein each of the plurality of triangles is a surface segment;

determine the normal direction for each of the plurality of triangles from the 3D coordinates of each of the cloud points in the combination of three neighboring cloud points making up a respective triangle;

derive the surface absorption property for a respective segment of the surface material based upon the average intensity values for the three neighboring cloud points making up a respective triangle, a known angle of incidence received from the LIDAR sensor, and the determined normal direction for each of the respective triangle; and aggregate the derived surface absorption property across a collection of respective triangles making up the surface segments to result in the surface absorption property for a type of surface.

16. The non-transitory computer-readable storage medium of claim 15, wherein the computer-readable medium further comprises instructions that, when executed by the computing system, cause the computing system to:

select one of the three neighboring cloud points as a starting point cloud;

search for the closest first and second cloud points from the starting point cloud within a threshold distance; and form a first triangle from the closest first and second cloud points and the starting point.

17. The non-transitory computer-readable storage medium of claim 15, wherein the computer-readable medium further comprises instructions that, when executed by the computing system, cause the computing system to:

determine a difference between the normal directions of neighboring triangles; and conclude that the surface material represented by the neighboring triangles is curved when the difference between the normal directions of the neighboring triangles is greater than 20-degrees.

18. The non-transitory computer-readable storage medium of claim 15, the deriving the surface absorption property for the respective segment is a product of the average intensity values for the three neighboring cloud points making up the respective triangle and cosine of the angle of incidence to the normal direction for the respective triangle.

19. The non-transitory computer-readable storage medium of claim 15, wherein the computer-readable medium further comprises instructions that, when executed by the computing system, cause the computing system to utilize the surface absorption property for the type of surface to improve a representation of the type of surface in a simulated environment, whereby intensity values recorded by a simulated LIDAR in the simulated environment are more accurate.

20. The non-transitory computer-readable storage medium of claim 15, wherein the computer-readable medium further comprises instructions that, when executed by the computing system, cause the computing system to train a machine-learning algorithm to recognize objects using LIDAR cloud points recorded in the simulated environment, whereby the machine-learning algorithm learns to recognize objects in part based on intensity values associated with surface materials making up the objects.

* * * * *